(12) United States Patent
Kruglick

(10) Patent No.: US 9,367,370 B2
(45) Date of Patent: Jun. 14, 2016

(54) NOC LOOPBACK ROUTING TABLES TO REDUCE I/O LOADING AND OFF-CHIP DELAYS

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/468,238

(22) Filed: Aug. 25, 2014

(65) Prior Publication Data
US 2016/0055041 A1    Feb. 25, 2016

(51) Int. Cl.
*G06F 9/54*     (2006.01)
*G06F 9/455*    (2006.01)

(52) U.S. Cl.
CPC ............ *G06F 9/546* (2013.01); *G06F 9/45558* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 8,601,133 B1 * | 12/2013 | Rainovic | ............. | H04L 12/4633 709/227 |
| 2008/0144670 A1 * | 6/2008 | Goossens | ................ | G06F 15/78 370/503 |
| 2009/0172301 A1 * | 7/2009 | Ebersole | ................ | G06F 15/16 711/154 |
| 2011/0087943 A1 * | 4/2011 | Mangione-Smith | | G06F 13/4022 714/748 |
| 2011/0178831 A1 * | 7/2011 | Ravichandran | ............... | 705/7.11 |
| 2012/0216216 A1 * | 8/2012 | Lopez Taboada | ....... | G06F 9/546 719/314 |
| 2015/0277995 A1 * | 10/2015 | Raju et al. | | |

OTHER PUBLICATIONS

"Hot Chips: A Symposium on High Performance Chips," accessed at http://web.archive.org/web/20140228025833/http://www.hotchips.org/archives/hc23/, accessed on Aug. 12, 2014, pp. 8.
"Intel Threading Building Blocks," accessed at http://web.archive.org/web/20140805212319/https://www.threadingbuildingblocks.org/, accessed on Aug. 12, 2014, pp. 3.
"TILEPro64™ Processor," Tilera Corporation, pp. 2 (2008-2011).
"Amazon Simple Queue Service," Developer Guide, accessed at http://web.archive.org/web/20121111093159/http://docs.amazonwebservices.com/AWSSimpleQueueService/2008-01-01/SQSDeveloperGuide/, accessed on Aug. 12, 2014, pp. 2.
"AMBA AXI Protocol specification," ARM Limited Version 1.0, pp. 108 (2004).
"AMBA™ Specification," ARM Limited, Version 2.0, pp. 230 (1999).

(Continued)

*Primary Examiner* — Andy Ho
*Assistant Examiner* — Abdou Seye
(74) *Attorney, Agent, or Firm* — Turk IP Law, LLC

(57) ABSTRACT

Technologies are generally described to implement loopback simulation of inter-core messages in multicore processors. In some examples, a multicore processor may execute one or more processes, where each process communicates with other processes on or off the processor. Messages originating from processes on the multicore processor and destined for other processes on the multicore processor may be intercepted by a loopback simulator executing on the multicore processor. The loopback simulator may then redirect the intercepted messages to the destination processes on the multicore processor without the messages leaving the multicore processor.

33 Claims, 7 Drawing Sheets

(56) References Cited

OTHER PUBLICATIONS

"AMD "Pacifica" Virtualization Technology," Accessed at http://www.slideshare.net/Cameroon45/amd-pacifica-virtualization-technology, Accessed on Aug. 12, 2014, pages.
"Dot-decimal notation," accessed at http://web.archive.org/web/20140806064803/http://en.wikipedia.org/wiki/Dot-decimal_notation, accessed on Aug. 12, 2014, pp. 4.
"Hardware-Assisted Virtualization Technology," Accessed at http://web.archive.org/web/20130928130020/http://www.intel.com/content/www/us/en/virtualization/virtualization-technology/hardware-assist-virtualization-technology.html, Accessed on Aug. 12, 2014, pp. 3.
"Media Independent Interface," Accessed at http://web.archive.org/web/20140802160705/http://en.wikipedia.org/wiki/Media_Independent_Interface, Accessed on Aug. 12, 2014, pp. 10.
"OCP-IP Transfers Assets to Accellera," OCP-IP Association, accessed at http://web.archive.org/web/20140625093431/http://www.ocpip.org/, accessed on Aug. 12, 2014, pp. 2.
"The TCP Maximum Segment Size and Related Topics," accessed at http://web.archive.org/web/20131230015841/http://tools.ietf.org/html/rfc879, accessed on Aug. 12, 2014, pp. 12.
"XAUI," Accessed at http://web.archive.org/web/20130623140711/http://en.wikipedia.org/wiki/XAUI, Accessed on Aug. 12, 2014, pp. 5.
Attia, B. et al., "A Modular Network Interface Design and Synthesis Outlook," International Journal of Computer Science Issues, vol. 9, No. 3, pp. 470-482 (2012).
Benson, T., et al., "Network traffic characteristics of data centers in the wild," in Proceedings of the 10th annual conference on Internet measurement (ACM, 2010), pp. 267-280 (2010).
Carara, E. A., and Moraes, F. G., "MPSoC-H—Implementação e Avaliação de Sistema MPSoC Utilizando a Rede Hermes," Technical Report Series (2005).
Contreras, G., and Martonosi, M., "Characterizing and Improving the Performance of Intel Threading Building Blocks," In Workload Characterization, IEEE International Symposium on IISWC 2008, pp. 57-66 (2008).
Ferro, G., "Average IP Packet Size | Slaptijack," posted on Mar. 18, 2010, accessed at http://web.archive.org/web/20131108085031/http://etherealmind.com/average-ip-packet-size, accessed on Aug. 12, 2014, pp. 3.
Greenberg, A., et al., "VL2: a scalable and flexible data center network," Communications of the ACM, vol. 54, No. 3, pp. 95-104 (2011).
Haring, R. et al., "The Blue Gene/Q Compute Chip," In the 23rd Symposium on High Performance Chips (Hot Chips), pp. 20 (2011).
Kachris, C. "Network Processing in Multi-core FPGAs with Integrated Cache-Network Interface," 2010 International Conference on Reconfigurable Computing and FPGAs (ReC onFig), pp. 328-333 (2010).
Matsuzaki, K., "An Efficient Implementation of Data-Parallel Skeletons on Multicore Processors," Accessed at http://web.archive.org/web/20101128154141/http://graal.ens-lyon.fr/~lmarchal/aussois/slides/matsuzaki.pdf, Accessed on Aug. 12, 2014, pp. 20.
Mohebbi, H. R., et al., "ZIVM: A Zero-Copy Inter-VM Communication Mechanism for Cloud Computing," Computer and Information Science, Canadian Center of Science and Education, vol. 4, No. 6, pp. 18-27 (2011).
Mora, J., "Understanding Bulldozer architecture through Linpack benchmark," HPC Advisory Council,ISC 2012, Hamburg, pp. 22 (2012).
Ren, Y., et al., "A Fast and Transparent Communication Protocol for Co-Resident Virtual Machines," 8th International Conference on Collaborative Computing: Networking, Applications and Worksharing (CollaborateCom), pp. 70-79 (2012).
Schaefer, C. A., "Reducing Search Space of Auto-tuners Using Parallel Patterns," In Proceedings of the 2009 ICSE Workshop on Multicore Software Engineering, pp. 17-24 (2009).
Schauer, B., "Multicore Processors—A Necessity," Discovery Guides, ProQuest, pp. 1-14 (2008).
Schooler, R., "Tile Processors: Many-Core for Embedded and Cloud Computing," TILERA Corporation, Sep. 15, 2010, pp. 47.
Vajda, A., and Brorsson, M., "Multi-core and Many-core Processor Architectures," Programming Many-Core Chips, Chapter 2, Springer Science+Business Media, LLC, pp. 9-43 (2011).
Wang, J. et al., "XenLoop: A Transparent High Performance Inter-VM Network Loopback," HPDC'08 Proceedings of the 17th international symposium on High performance distributed computing, pp. 109-118 (2008).
Wentzlaff, D., P. et al., "On-chip Interconnection Architecture of the Tile Processor," Micro, IEEE, vol. 27, No. 5, pp. 15-31 (2007).
Zhang-Shen, R. and McKeown, N., "Designing a Predictable Internet Backbone with Valiant Load-Balancing," in Proceeding IWQoS'05 Proceedings of the 13th international conference on Quality of Service, editors: Meer, H and Bhatti, N., vol. 3552, pp. 178-192 (2005).
"IEEE Xplore—FCCM: A Novel Inter-Core Communication Mechanism in Multi-Core Platform", Dec. 26-28, pp. 215-218.
"HC23-S1: ManyCore," accessed at https://www.youtube.com/watch?v=ZZ2nWq8UK5A, Aug. 18, 2011, pp. 2.
Luo,C., et al., "IEEE IEEE Xplore—FCCM: A Novel Inter-Core Communication Mechanism in Multi-Core Platform", Dec. 26-28, 2009, pp. 215-218.

\* cited by examiner

U.S. 9,367,370 B2

NOC LOOPBACK ROUTING TABLES TO REDUCE I/O LOADING AND OFF-CHIP DELAYS

BACKGROUND

Unless otherwise indicated herein, the materials described in this section are not prior art to the claims in this application and are not admitted to be prior art by inclusion in this section.

Cloud-based systems, used in many web-enabled and/or distributed applications, continue to grow in popularity. The datacenters that underpin these cloud-based systems often include physical servers that implement multiple, different virtualized environments or virtual machines, each configured to execute a particular operating system and/or application. A particular physical server may include one or more processors, and each processor may include one or more processor cores, each of which may be able to execute a different operating system and/or application.

SUMMARY

The present disclosure generally describes techniques to implement loopback simulation of inter-core messages in multicore processors.

According to some examples, a method is provided for on-chip loopback in multicore processors. The method may include identifying one or more processes on a multicore processor, where the processes may be adapted to communicate with each other via an off-chip network. The method may further include generating a simulated network loopback at a processor hardware layer to deliver messages between the process(es) without using the off-chip network.

According to other examples, a multicore processor is provided for performing on-chip loopback. The multicore processor may include multiple processor cores and a controller configured to identify one or more processes executing on the processor cores, where the processes may be adapted to communicate with each other via an off-chip network. The multicore processor may further include a loopback simulator at a processor hardware layer, where the loopback simulator may be configured to deliver messages between the process(es) via on-chip communication.

According to some examples, a computer readable medium may store instructions for performing on-chip loopback in multicore processors. The instructions may include identifying one or more processes on a multicore processor, where the processes may be adapted to communicate with each other via an off-chip network. The instructions may further include generating a simulated network loopback at a processor hardware layer to deliver messages between the process(es) without using the off-chip network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
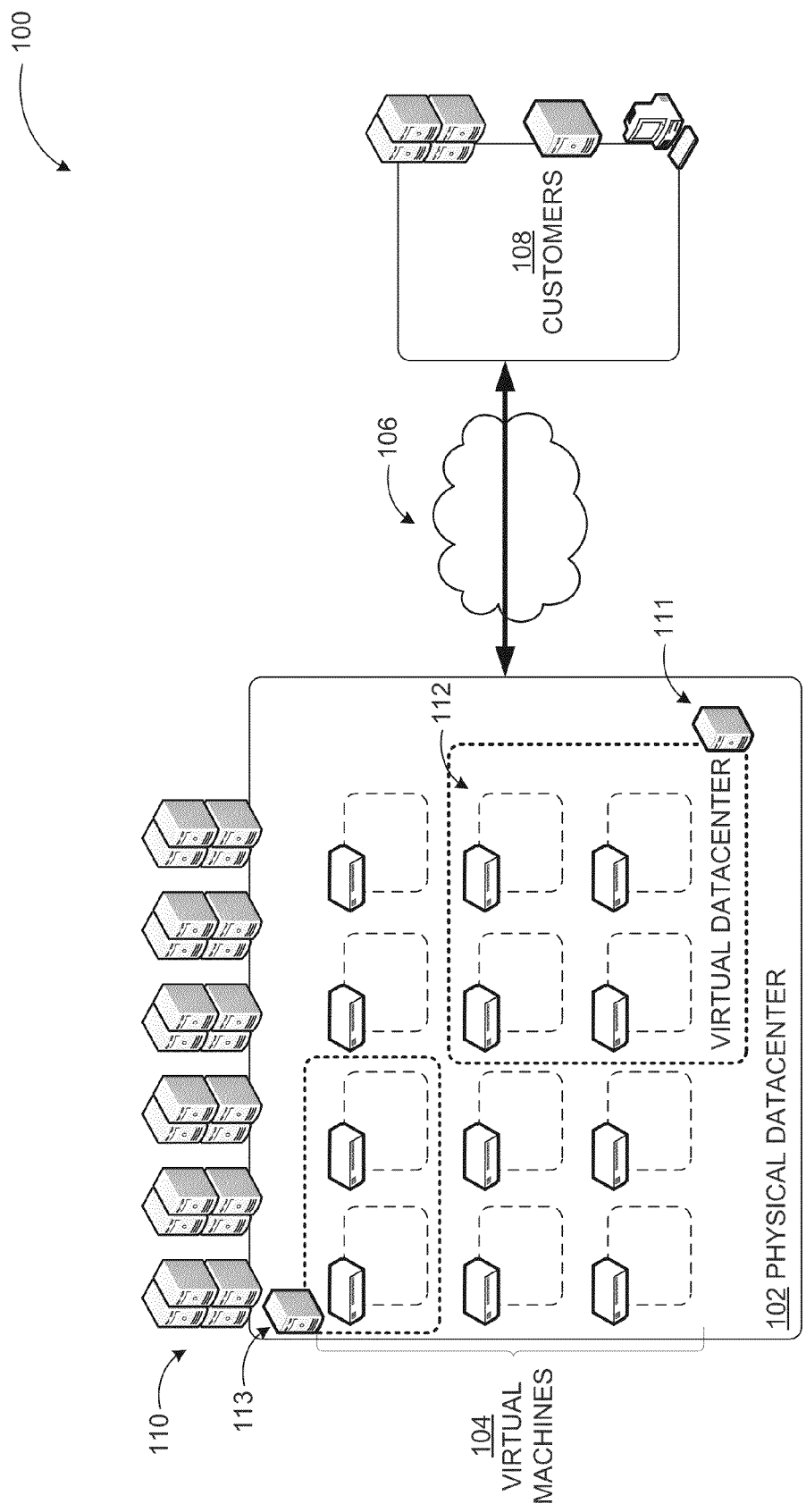
FIG. 1 illustrates an example datacenter-based system where loopback simulation of inter-core messages in multicore processors may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to reducing input/output loading and off-chip delays in multicore processors through loopback simulation of inter-core messages.

Briefly stated, technologies are generally described to implement loopback simulation of inter-core messages in multicore processors. A multicore processor may execute one or more processes, where each process communicates with other processes on or off the processor. Messages originating from processes on the multicore processor and destined for other processes on the multicore processor may be intercepted by a loopback simulator executing on the multicore processor. The loopback simulator may then redirect the intercepted messages to the destination processes on the multicore processor without the messages leaving the multicore processor.

FIG. 1 illustrates an example datacenter-based system where loopback simulation of inter-core messages in multicore processors may be implemented, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the physical server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via a cloud 106.

In some embodiments, a physical server such as the physical servers 111 and 113 may include one or more multicore processors, each of which includes multiple processor cores. Each of these processor cores may then be capable of executing a separate instance of a virtual machine (VM), operating system, and/or application at a particular time.

Many web applications and services are designed to communicate using messaging capacities such as message queues, and datacenter architectures are designed so that communication between individual instances of applications or services are network-centric. For example, a message from a first instance to a second instance may be routed onto a datacenter network before being routed to the second instance. This messaging scheme may work fairly well for instances located at different physical servers. However, for situations in which both the originating and destination instances reside on the same physical hardware, such as different cores on a multicore processor, routing messages through a network external to the hardware (in other words, an "off-chip" network) may introduce undesirable and unnecessary network delays and input/output loading at the hardware. Providing a mechanism by which such inter-core messages can be intercepted and redirected "on-chip" (that is, at the multicore processor) may allow reduction of off-chip delays and processor I/O loading.

Figure 2:
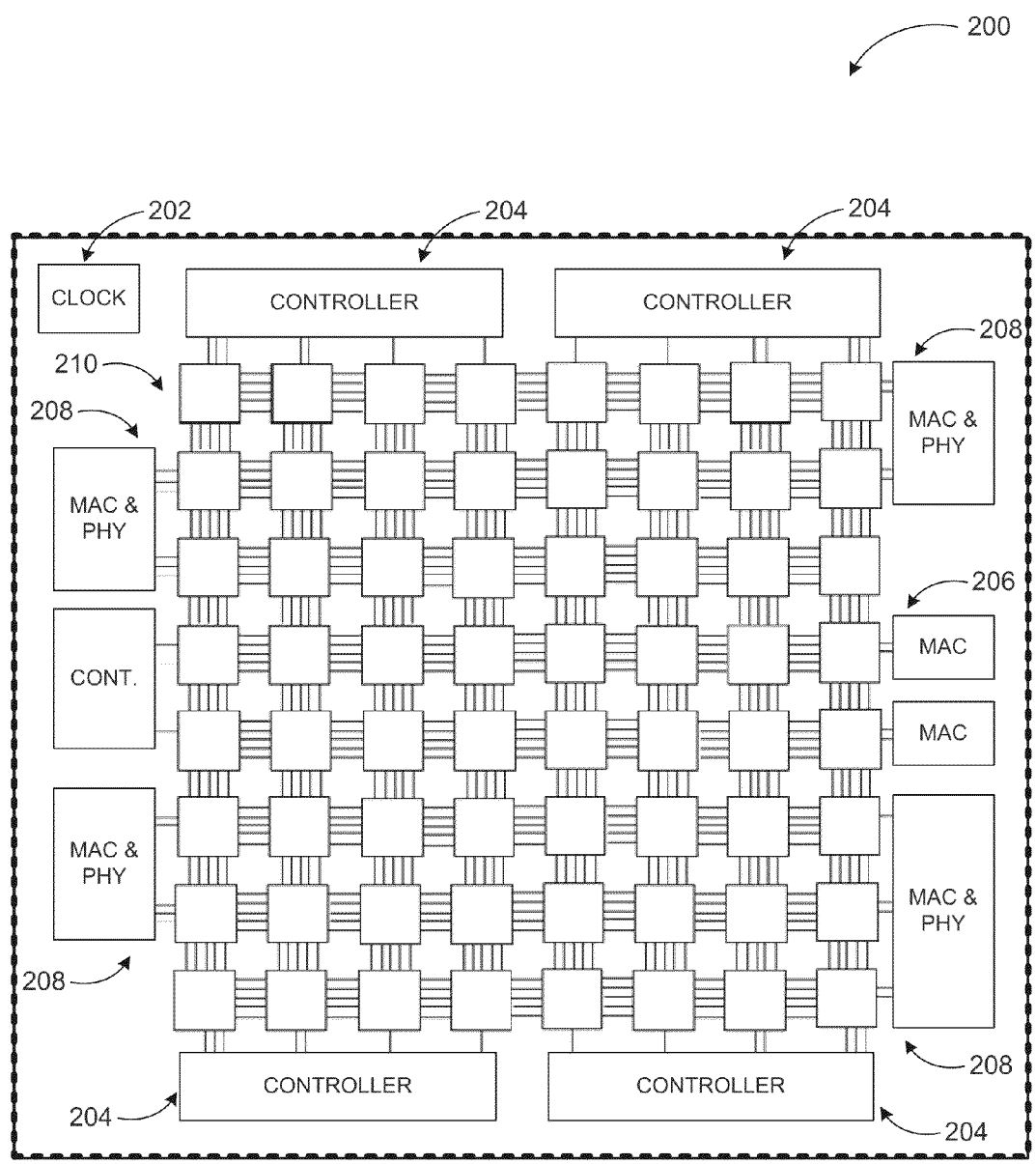
FIG. 2 illustrates an example multicore processor where loopback simulation of inter-core messages in multicore processors may be implemented.

FIG. 2 illustrates an example multicore processor where loopback simulation of inter-core messages in multicore processors may be implemented, arranged in accordance with at least some embodiments described herein.

According to FIG. 2, a multicore processor 200 may include multiple processor cores 210, a clock 202, one or more memory controllers 204, and one or more processor input/output (I/O) or network ports, such as a media access control (MAC) layer 206 or a MAC/physical (PHY) layer 208. In some embodiments, each processor core or cores in the processor cores 210 may be capable of executing a different application instance, virtual machine instance, or operating system, and may be interconnected with at least two other processor cores. The clock 202 may provide clock signals for the operation of the processor cores 210 and other circuitry on the multicore processor 200. The memory controllers 204 may provide access to data buses that couple to RAM, a network on chip (NoC), other memory, or other hardware components. Messages between individual cores in the processor cores 210 may be formed of one or more flow control digits or "flits". When a VM or application instance on a processor core sends a message to another instance, the message may travel as flits to the periphery of the multicore processor 200, where the flits may then be encoded into larger network packets at the MAC layer 206 and/or the MAC/PHY layer 208. After flit assembly into message network packets is completed, the MAC layer 206 or the MAC/PHY layer 208 may handle further message queuing and send messages on to their destinations via an off-chip network. Similarly, the MAC layer 206 or the MAC/PHY layer 208 may receive message network packets originating from off-chip sources, decode the network packets into on-chip flits, then distribute the flits to the appropriate core in the processor cores 210.

As described above, an individual multicore processor such as the multicore processor 200 at a datacenter may execute multiple instances of web applications, services, virtual machines, and/or operating systems, each on a different one of the multiple processor cores 210. In order to communicate with other instances, an application instance on one of the multiple processor cores 210 may send messages that travel as flits to I/O ports (that is, the MAC layers 206 and/or the MAC/PHY layers 208) at the periphery of the multicore processor 200. The I/O ports may then encode the flits into packets and then send the packets off-chip to be routed to their eventual destinations. In the event that one of those eventual destinations is an instance executed on another processor core on the multicore processor 200, the I/O ports may then receive the same packets that they originally encoded, decode the packets into flits, and then send the flits on to the destination processor core. Such off-chip network routing behavior may introduce delays and extraneous I/O port loading. At the same time, many multicore processors have built-in tools for handling communications between different cores within the same processor, such as Network-on-Chip (NoC) implementations. In these circumstances, it may be useful to intercept data destined for another core within the same processor at the processor and redirect the data using the processor's built-in tools (for example, the NoC) instead of sending the data off-chip for network routing. In some embodiments, this may be accomplished using a loopback controller, described in more detail below.

Figure 3:
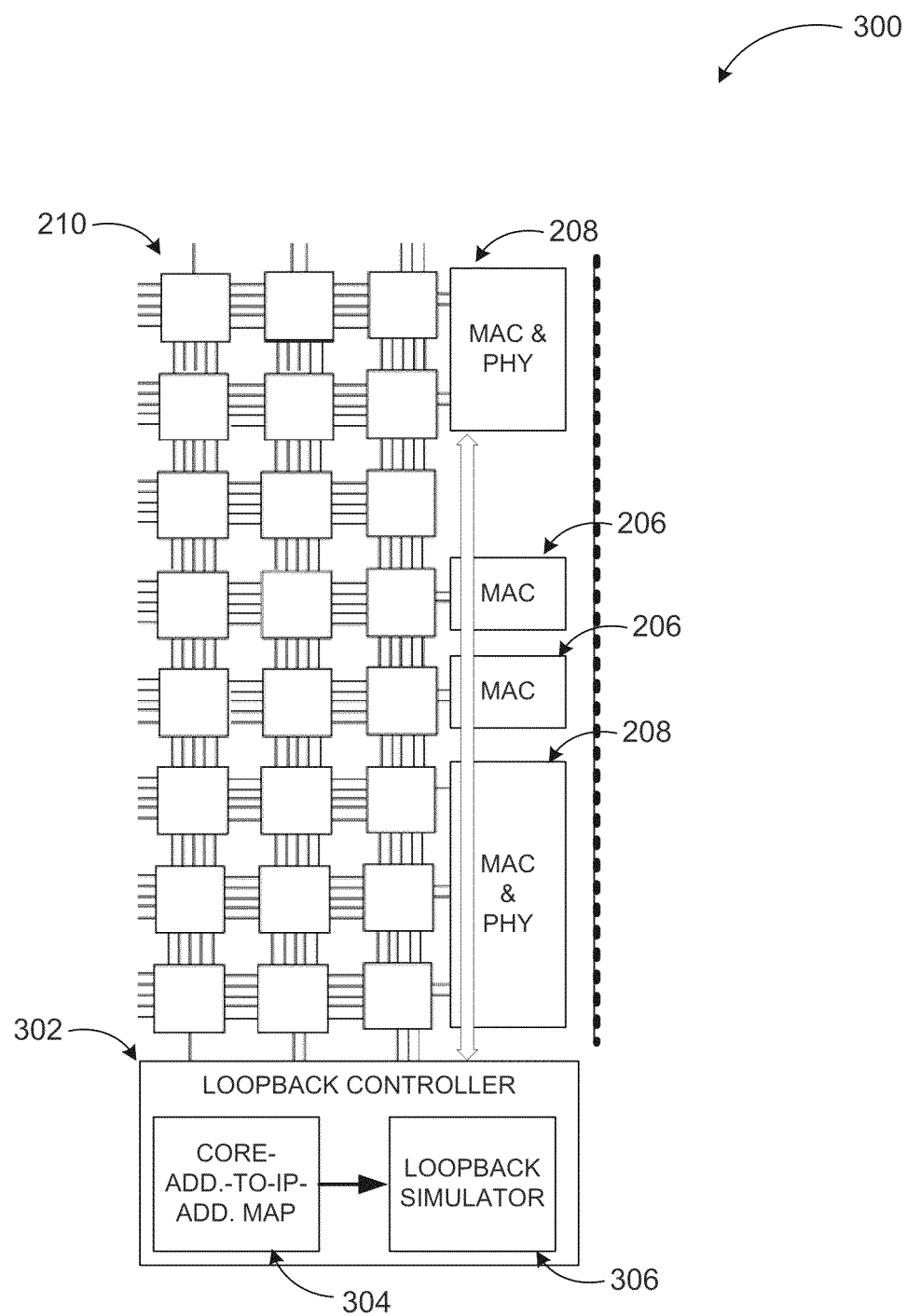
FIG. 3 illustrates a portion of a multicore processor with a loopback controller.

FIG. 3 illustrates a portion of a multicore processor with a loopback controller, arranged in accordance with at least some embodiments described herein.

A diagram 300 depicts a portion of a multicore processor such as the multicore processor 200 in FIG. 2, with similarly-numbered elements operating similarly. For example, the multicore processor portion in the diagram 300 may include processor cores 210 and I/O ports such as the MAC layers 206 and the MAC/PHY layers 208, similar to the corresponding elements in the multicore processor 200. In addition, the multicore processor portion may include a loopback controller 302 that implements a core-address-to-IP-address map 304 and a loopback simulator 307.

In some embodiments, the loopback controller 302 may be configured to intercept and redirect data from cores in the processor cores 210 and destined for other cores in the processor cores 210. The loopback controller 302 may be coupled to and/or implemented at the I/O ports (that is, the MAC layers 206 and/or the MAC/PHY layers 208). When a message from a processor core in the processor cores 210 reaches the I/O ports, the loopback controller 302 may determine whether the message is intended for another processor core in the processor cores 210, and if so, route the message to the other processor core without allowing the message to travel off-chip.

In some embodiments, the loopback controller 302 may determine whether the message is intended for another processor core in the processor cores 210 based on the core-address-to-IP-address map 304. When different cores in the processor cores 210 execute different application instances, a particular instance (and its associated core) may have an identifier or address that allows other instances to send messages to the particular instance. In a datacenter architecture, this address may take the form of an internet protocol (IP) address or MAC address (used interchangeably herein), and off-chip network routing may use the IP address to determine how to route different messages. In order to avoid using off-chip network routing, the core-address-to-IP-address map 304, which may be implemented either in the loopback controller 302 or at one or more of the I/O ports, may store the application-address relationship. In some embodiments, the core-address-to-IP-address map 304 may map individual IP addresses to identifiers for application instances, virtual machines, or individual cores at the processor cores 210. For example, the core-address-to-IP-address map 304 may include a table that associates a core identifier for a core in the processor cores 210 executing a particular application instance with the IP address associated with that particular instance.

The core-address-to-IP-address map 304 may be generated and/or updated in a number of ways. For example, IP addresses of cores, VMs, and applications at the processor cores 210 may be determined based on the headers on flit addresses. When flits arrive at I/O ports associated with the processor cores 210, the I/O ports may read address and/or header information associated with the flits (indicating flit origin and/or destination core-address) and address information associated with the resulting packets assembled from the flits (indicating network level IP-address) and forward the information to the loopback controller 302 for generation or updating of the core-address-to-IP-address map 304. In some embodiments, other on-chip communications (for example, over the network-on-chip or NoC) may be monitored by a hypervisor or an operating system I/O driver for IP addresses and/or core, VM, or application identifiers. Detected addresses and identifiers may then be used to populate the core-address-to-IP-address map 304. Alternately, applications or virtual machines running on cores may expressly register their IP-address with the core-address-to-IP-address map 304, for example, via an API or interaction with the virtual machine manager (VMM).

Once the loopback controller 302 has determined that data from a core in the processor cores 210 is destined for another core in the processor cores 210, the loopback controller 302 may then use the loopback simulator 306 to mimic the behavior of off-chip network routing without actually sending the data off-chip. In some embodiments, the loopback simulator 306 may be configured to receive packets originating from an on-chip source and destined for an on-chip destination from the I/O ports and send the data in those packets to the on-chip destination. The loopback simulator 306 may send the data back to the on-chip destination by feeding the packets back to the I/O ports (for example, at a decode stage of the I/O ports or MAC/MAC/PHY layer) as incoming packets by simulating packet network transmission and reception. In some embodiments the loopback simulator 306 may feed the packets back to the I/O ports for decoding into on-chip flits; in other embodiments the loopback simulator itself may decode the packets into on-chip flits and place the flits on the network-on-chip connecting the different processor cores in the processor cores 210. In these embodiments, the loopback simulator 306 may be implemented by duplicating logic used by the I/O ports to convert incoming packets into on-chip flits for the NoC.

As described above, a core-address-to-IP-address map may be used to determine whether an outgoing message from an on-chip source is destined for an on-chip destination, and may include identifiers and addresses for cores and applications. In some embodiments, the core-address-to-IP-address map may also include information about virtual machines being executed on the processor cores. For example, the core-address-to-IP-address map may associate a core identifier for a core with a VM record that identifies the particular VM executing on that core, and may further associate the VM record with the IP address of an application executing at that particular VM. The core-address-to-IP-address map may store these associations in the same table or at different tables. In embodiments where VM records are stored, the core-address-to-IP-address map 304 may be implemented using a direct mapped buffer with each VM record associated with a "not active bit" indicating whether the respective VM is currently active or in state storage.

Figure 4:
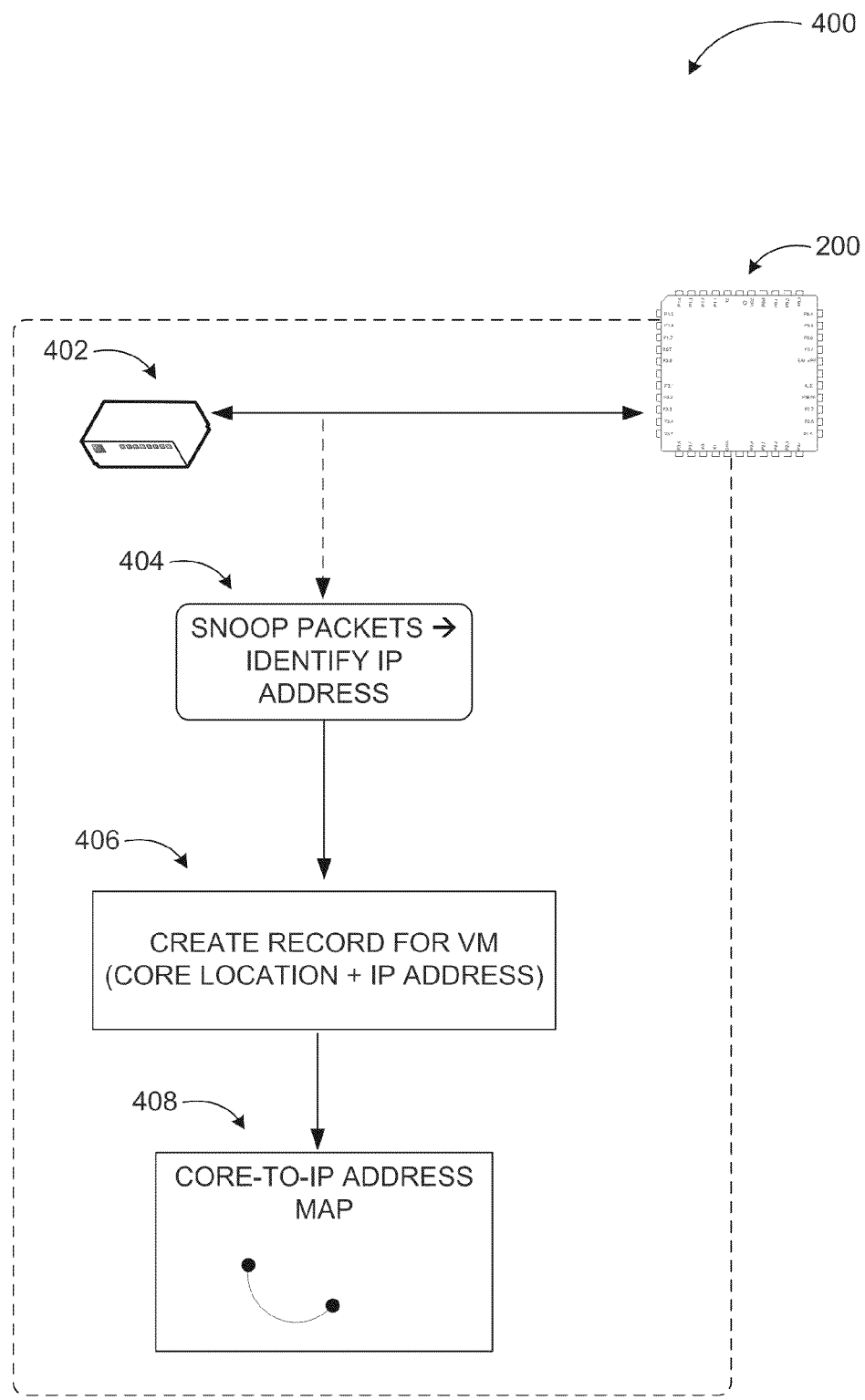
FIG. 4 illustrates example functional blocks in an implementation of loopback simulation of inter-core messages in multicore processors.

FIG. 4 illustrates example functional blocks in an implementation of loopback simulation of inter-core messages in multicore processors, arranged in accordance with at least some embodiments described herein.

According to a diagram 400, a loopback controller 402 (similar to the loopback controller 302) may be configured to detect or "snoop" core-generated network packets at the I/O ports or other network hardware located at the edge of the multicore processor 200. The loopback controller 402 may perform the packet snooping using appropriate snooping hardware. A separate copy of the snooping hardware may be located at each network or I/O port of the multicore processor 200, or even at each individual processor core in the multicore processor 200. The loopback controller 402 may first snoop the network packets to identify a source IP address (404). For example, the loopback controller 402 may snoop packets to determine the identifier or address associated with the originating core, application, or VM. In the latter case, the loopback controller 402 may be configured to snoop packets to determine application/VM identity only when the application or VM is active, as determined by a hypervisor or some other application/VM activity tracker. Subsequently, the loopback controller 402 may create a VM record (406) as described above that includes a location or identifier associated with the core executing the VM as well as an IP address associated with the VM or an application being executed by the VM. The VM record may then be used to populate a core-to-IP-address map 408, similar to the core-address-to-IP-address map 304 described above. In some embodiments, the core-to-IP-address map containing VM record information may be exposed to any virtual machine managers administering the various VMs on the multicore processor for use as a VM management tool, for example to allow optimization of VM placement to reduce off-chip network delays. The core-to-IP-address map containing VM record information may also be exposed to management systems that process multiple processors and/or multiple servers to allow strategic relocation and optimization of VM placement. The loopback controller 402 and associated functional blocks described above may be implemented on a single chip (multicore processor 200) according to some embodiments.

While much of the above is described in terms of keeping messages originating from an on-chip process and destined for another on-chip process on the same processor, in other embodiments other variations may be implemented. For example, in systems where multiple multicore processors exist in the same package, message passing between the different processors in the same package may also be managed using the techniques described herein. In these systems, intra-processor (that is, "on-chip") message passing may be faster than intra-package (that is, between processors in the same package) message passing, which in turn may be faster than off-chip network routing that occurs outside the package.

Figure 5:
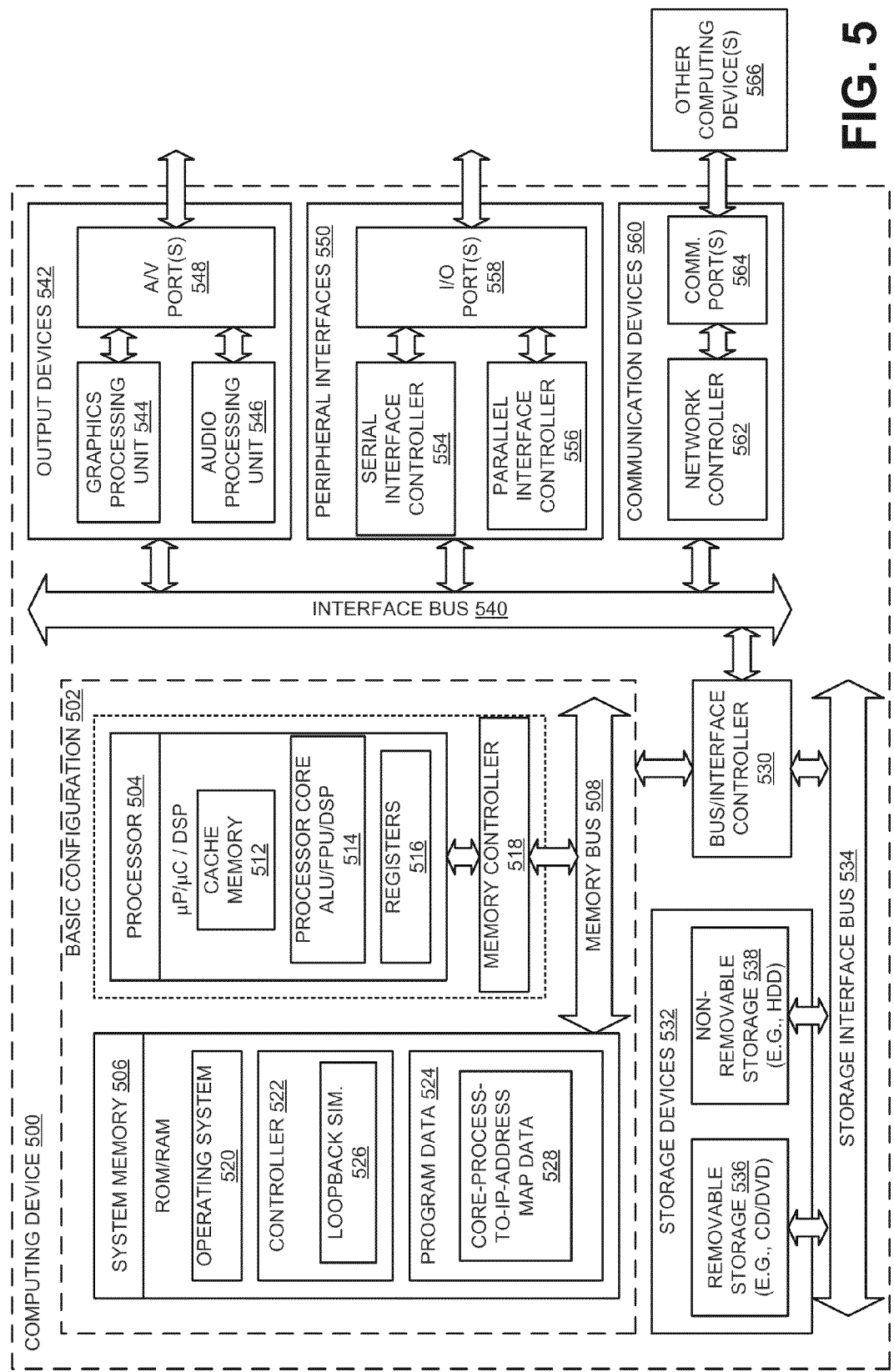
FIG. 5 illustrates a general purpose computing device, which may be used to implement loopback simulation of inter-core messages in multicore processors.

FIG. 5 illustrates a general purpose computing device, which may be used to implement loopback simulation of inter-core messages in multicore processors, arranged in accordance with at least some embodiments described herein.

For example, the computing device 500 may be used to implement loopback simulation of inter-core messages in multicore processors as described herein. In an example basic configuration 502, the computing device 500 may include one or more processors 504 and a system memory 506. A memory bus 508 may be used to communicate between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a controller 522, and program data 524. The controller 522 may include a loopback simulator 526 to implement loopback simulation of inter-core messages in multicore processors as described herein. The program data 524 may include, among other data, a core-process-to-IP-address map data 528 or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 550, and one or more communication devices 560) to the basic configuration 502 via the bus/interface controller 530. Some of the example output devices 542 include a graphics processing unit 544 and an audio processing unit 546, which may be configured to communicate to various external devices such as a display or speakers via one or more A/V ports 548. One or more example peripheral interfaces 550 may include a serial interface controller 554 or a parallel interface controller 556, which may be configured to communicate with external devices such as input devices keyboard, mouse, pen, voice input device, touch input device, etc.) or other peripheral devices (e.g., printer, scanner, etc.) via one or more I/O ports 558. An example communication device 560 includes a network controller 562, which may be arranged to facilitate communications with one or more other computing devices 566 over a network communication link via one or more communication ports 564. The one or more other computing devices 566 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Figure 6:
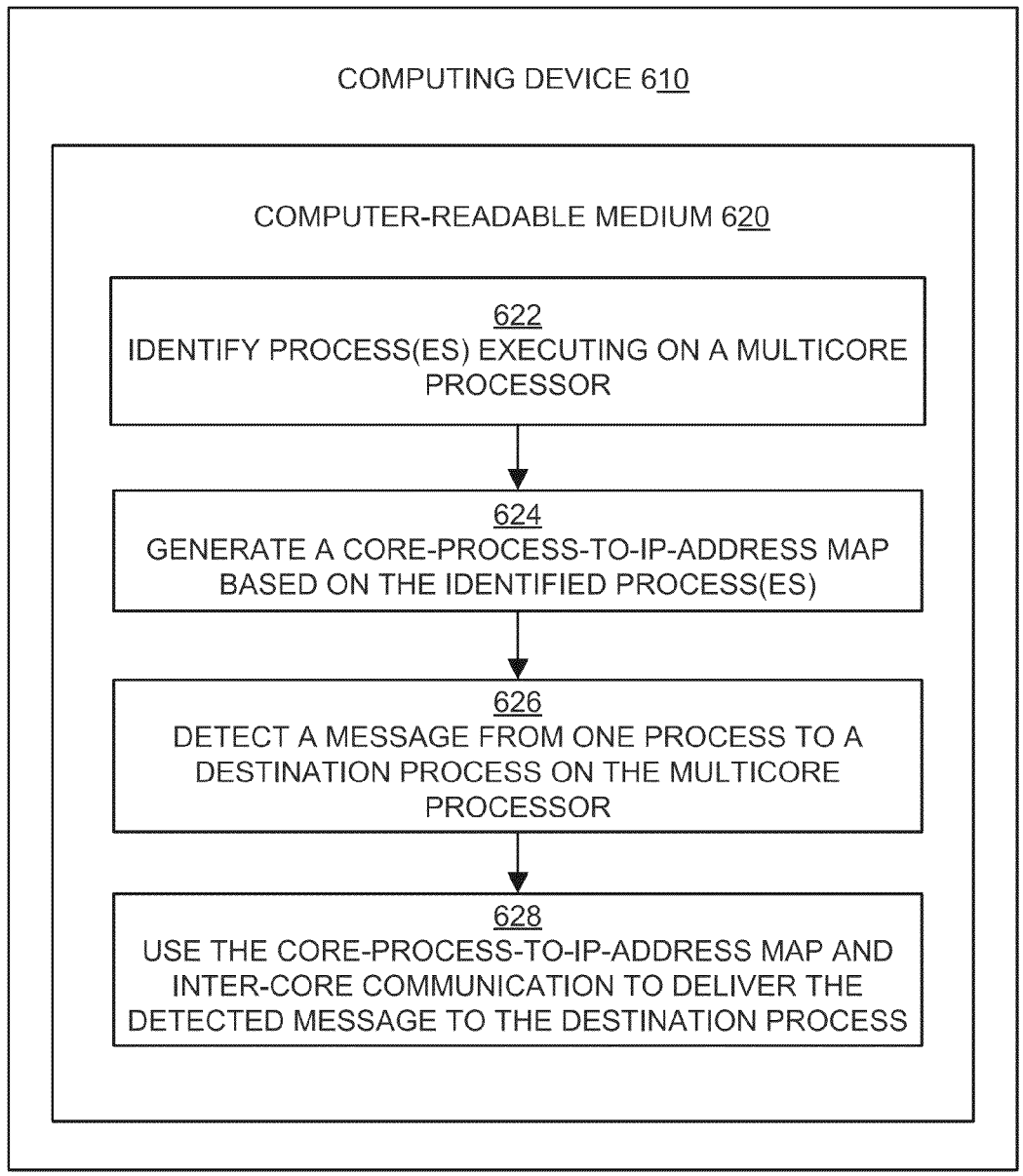
FIG. 6 is a flow diagram illustrating an example method to use loopback simulation of inter-core messages in multicore processors that may be performed by a computing device such as the computing device in FIG. 5.

FIG. 6 is a flow diagram illustrating an example method to use loopback simulation of inter-core messages in multicore processors that may be performed by a computing device such as the computing device in FIG. 5, arranged in accordance with at least some embodiments described herein.

Example methods may include one or more operations, functions or actions as illustrated by one or more of blocks 622, 624, 626, and/or 628, and may in some embodiments be performed by a computing device such as the computing device 600 in FIG. 6. The operations described in the blocks 622-628 may also be stored as computer-executable instructions in a computer-readable medium such as a computer-readable medium 620 of a computing device 610.

An example process to use loopback simulation of inter-core messages to reduce delays in multicore processors may begin with block 622, "IDENTIFY PROCESS(ES) EXECUTING ON A MULTICORE PROCESSOR", where a loopback controller (for example, the loopback controller 302) may identify processes such as application or virtual machine instances executing on one or more processor cores in a multicore processor (for example, the multicore processor 200).

Block 622 may be followed by block 624, "GENERATE A CORE-PROCESS-TO-IP-ADDRESS MAP BASED ON THE IDENTIFIED PROCESS(ES)", where the loopback controller may generate a core-process-to-IP-address map based on the processes identified in block 622. For example, the loopback controller may determine IP addresses, core identifiers, application identifiers, and/or VM identifiers associated with the processes executing on the multicore processor. The loopback controller may then generate and populate the core-process-to-IP-address map using the determined information, as described above in FIGS. 3-4.

Block 624 may be followed by block 626, "DETECT A MESSAGE FROM ONE PROCESS TO A DESTINATION PROCESS ON THE MULTICORE PROCESSOR", where the loopback controller and/or one or more processor I/O ports (for example, the MAC layers 206 and/or the MAC/PHY layers 208) may detect a message originating from a process executing on the multicore processor and destined for another process executing on the multicore processor, as described above.

Block 626 may be followed by block 628, "USE THE CORE-PROCESS-TO-IP-ADDRESS MAP AND INTER-CORE COMMUNICATION TO DELIVER THE DETECTED MESSAGE TO THE DESTINATION PROCESS", where the loopback controller and/or the processor I/O ports route the detected message to the destination process executing on the multicore processor without sending the message off-chip. For example, a loopback simulator (for example, the loopback simulator 306) may feed the detected message back to the processor I/O ports as a simulated incoming packet, or may itself decode the packet into on-chip flits and place the flits directly onto a network-on-chip, as described above.

Figure 7:
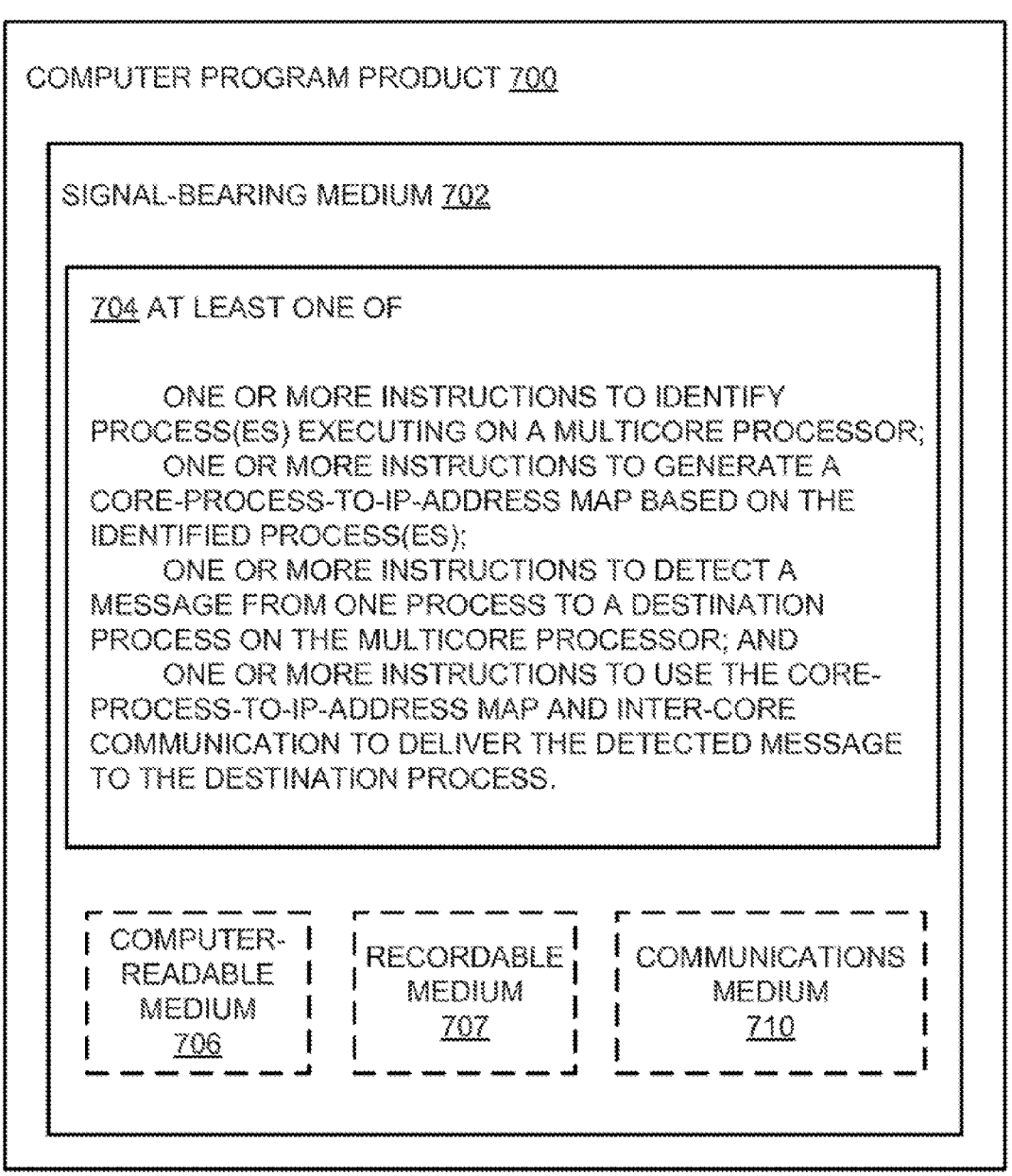
FIG. 7 illustrates a block diagram of an example computer program product, all arranged in accordance with at least some embodiments described herein.

FIG. 7 illustrates a block diagram of an example computer program product, arranged in accordance with at least some embodiments described herein.

In some examples, as shown in FIG. 7, a computer program product 700 may include a signal bearing medium 702 that it may also include one or more machine readable instructions 704 that, when executed by, for example, a processor may provide the functionality described herein. Thus, for example, referring to the processor 504 in FIG. 5, the controller 522 may undertake one or more of the tasks shown in FIG. 7 in response to the instructions 704 conveyed to the processor 504 by the signal bearing medium 702 to perform actions associated with implementing on-chip loopback as described herein. Some of those instructions may include, for example, instructions to identify process(es) executing on a multicore processor, generate a a-Re-process-to-IP-address map based on the identified process(es), detect a message from one process to a destination process on the multicore processor, and/or use the core-process-to-IP-address map and inter-core communication to deliver the detected message to the destination process, according to some embodiments described herein.

In some implementations, the signal bearing media 702 depicted in FIG. 7 may encompass computer-readable media 706, such as, but not limited to, a hard disk drive, a solid state drive, a Compact Disc (CD), a Digital Versatile Disk (DVD), a digital tape, memory, etc. In some implementations, the signal bearing media 702 may encompass recordable media 707, such as, but not limited to, memory, read/write (R/W) CDs, R/W DVDs, etc. In some implementations, the signal bearing media 702 may encompass communications media 710, such as, but not limited to, a digital and/or an analog communication medium (e.g., a fiber optic cable, a waveguide, a wired communications link, a wireless communication link, etc.). Thus, for example, the computer program product 700 may be conveyed to one or more modules of the processor 504 by an RF signal bearing medium, where the signal bearing media 702 is conveyed by the wireless communications media 710 (e.g., a wireless communications medium conforming with the IEEE 802.11 standard).

According to some examples, a method is provided for on-chip loopback in multicore processors. The method may include identifying one or more processes on a multicore processor, where the processes may be adapted to communicate with each other via an off-chip network. The method may further include generating a simulated network loopback at a processor hardware layer to deliver messages between the process(es) without using the off-chip network.

According to some embodiments, generating the simulated loopback may include identifying a destination core for a message at a media access control layer or a physical layer of the multicore processor, identifying data associated with the message to be delivered to an on-core process, and processing the identified data back into on-chip flits to be delivered to the identified destination core without the message leaving a processor die. The method may further include generating a core-process-to-IP-address map, and identifying the destination core for the message may include identifying the destination core based on the core-process-to-IP-address map. Generating the core-process-to-IP-address map may include forwarding, by a media access control layer of a processor network interface, one or more headers associated with one or more flit addresses and/or one or more IP-addresses. Generating the core-process-to-IP-address map may further include registering one or more map values as part of communications over a network-on-chip (NoC) by a hypervisor or an operating system I/O driver.

According to other embodiments, generating the core-process-to-IP-address map may include generating one or more virtual machine (VM) records, where a VM record corresponds to a respective VM and includes a respective core location and a respective IP address. Generating the core-process-to-IP-address map may further include identifying the respective IP address for the VM record(s) by snooping packets produced by the corresponding core(s) during times when the corresponding VM(s) are active.

According to further embodiments, generating the simulated loopback may further include routing outgoing packets that have a destination associated with a core in the core-process-to-IP-address map as incoming packets for a NoC. Generating the simulated loopback may further include converting the outgoing packets into one or more flits directed to the core that is to receive the incoming packets and/or routing the outgoing packets at a decode stage of the media access control layer. Generating the simulated loopback may further include redirecting packet traffic at each network interface such that packets destined to other cores of the multicore processor are forwarded to a loopback simulator. Generating the simulated loopback may further include decoding the forwarded packets into flit form destined for the destination core when a loopback decode functionality is available. The method may further include exposing the core-process-to-IP-address map to a virtual machine manager (VMM) for use as a management tool. Identifying the destination core based on the core-process-to-IP-address map may include identifying a VM identifier associated with the destination core.

According to other examples, a multicore processor is provided for performing on-chip loopback. The multicore processor may include multiple processor cores and a controller configured to identify one or more processes executing on the processor cores, where the processes may be adapted to communicate with each other via an off-chip network. The multicore processor may further include a loopback simulator at a processor hardware layer, where the loopback simulator may be configured to deliver messages between the process(es) via on-chip communication.

According to some embodiments, the controller may be further configured to generate a core-process-to-IP-address map, identify a destination processor core for a message at a media access control layer or a physical layer of the multicore processor based on the core-process-to-IP-address map, and identify data associated with the message to be delivered to an on-core process. The loopback simulator may be further configured to process the identified data back into on-chip flits to be delivered to the identified destination processor core without the message leaving a processor die.

According to other embodiments, the controller may be configured to generate the core-process-to-IP-address map by forwarding of one or more headers associated with one or more flit addresses at a media access control layer of a processor network interface. The controller may be configured to generate the core-process-to-IP-address map by having a hypervisor or an operating system I/O driver register one or more map values as part of communications over a network-on-chip (NoC). The controller may be configured to generate the core-process-to-IP-address map by generation of one or more virtual machine (VM) records, where a VM record corresponds to a respective VM and includes a respective processor core location and a respective IP address. The controller may be configured to identify the respective IP address by snooping of packets produced by the corresponding processor core during times when the corresponding VM is active. The controller may be configured to snoop packets at processor edge network hardware using a single copy of snooping hardware per network port and/or using separate snooping hardware for each processor core in the multiple processor cores.

According to further embodiments, the loopback simulator may be further configured to route outgoing packets that have a destination associated with a processor core in the core-process-to-IP-address map as incoming packets for a NoC. The loopback simulator may be further configured to convert the outgoing packets into one or more flits directed to the processor core that is to receive the incoming packets. The loopback simulator may be further configured to route the outgoing packets at a decode stage of the media access control layer. The controller may be further configured to maintain the core-process-to-IP-address map at each of multiple network interfaces such that each network interface forwards packets destined to other processor cores in the multiple processor cores to the loopback simulator. The loopback simulator may be further configured to perform packet decoding and decode the forwarded packets into flit form destined for the destination processor core and/or duplicate logic used to convert incoming packets to flits for the NoC.

According to yet further embodiments, the controller may be further configured to expose the core-process-to-IP-address map to a virtual machine manager (VMM) for use as a management tool. The controller may be configured to generate the core-process-to-IP-address map by inclusion of multiple VM identifiers, each VM identifier associated with a core identifier. The core-process-to-IP-address map may be implemented using a direct mapped buffer with a "not active bit" indicating whether a VM is currently in state storage. Each of the multiple processor cores may execute a different operating system.

According to some examples, a computer readable medium may store instructions for performing on-chip loopback in multicore processors. The instructions may include identifying one or more processes on a multicore processor, where the processes may be adapted to communicate with each other via an off-chip network. The instructions may further include generating a simulated network loopback at a processor hardware layer to deliver messages between the process(es) without using the off-chip network.

According to some embodiments, generating the simulated loopback may include identifying a destination core for a message at a media access control layer or a physical layer of the multicore processor, identifying data associated with the message to be delivered to an on-core process, and processing the identified data back into on-chip flits to be delivered to the identified destination core without the message leaving a processor die. The instructions may further include generating a core-process-to-IP-address map, and identifying the destination core for the message may include identifying the destination core based on the core-process-to-IP-address map. Generating the core-process-to-IP-address map may include forwarding, by a media access control layer of a processor network interface, one or more headers associated with one or more flit addresses. Generating the core-process-to-IP-address map may further include registering one or more map values as part of communications over a network-on-chip (NoC) by a hypervisor or an operating system I/O driver.

According to other embodiments, generating the core-process-to-IP-address map may include generating one or more virtual machine (VM) records, where a VM record corresponds to a respective VM and includes a respective core location and a respective IP address. Generating the core-process-to-IP-address map may further include identifying the respective IP address for the VM record(s) by snooping packets produced by the corresponding core(s) during times when the corresponding VM(s) are active.

According to further embodiments, generating the simulated loopback may further include routing outgoing packets that have a destination associated with a core in the core-process-to-IP-address map as incoming packets for a NoC. Generating the simulated loopback may further include converting the outgoing packets into one or more flits directed to the core that is to receive the incoming packets and/or routing the outgoing packets at a decode stage of the media access control layer. Generating the simulated loopback may further include redirecting packet traffic at each network interface such that packets destined to other cores of the multicore processor are forwarded to a loopback simulator. Generating the simulated loopback may further include decoding the forwarded packets into flit form destined for the destination core when a loopback decode functionality is available. The instructions may further include exposing the core-process-to-IP-address map to a virtual machine manager (VMM) for use as a management tool. Identifying the destination core based on the core-process-to-IP-address map may include identifying a VM identifier associated with the destination core.

Various embodiments may be implemented in hardware, software, or combination of both hardware and software (or other computer-readable instructions stored on a non-transitory computer-readable storage medium and executable by one or more processors); the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs executing on one or more computers e.g., as one or more programs executing on one or more computer systems), as one or more programs executing on one or more processors (e.g., as one or more programs executing on one or more microprocessors), as firmware, or as virtually any combination thereof, and designing the circuitry and/or writing the code for the software and/or firmware are possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. Also, the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. A data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. Such depicted architectures are merely exemplary, and in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method for on-chip loopback in multicore processors, the method comprising:
    identifying one or more processes on a multicore processor, wherein the processes are adapted to communicate with each other via an off-chip network; and
    generating a simulated network loopback at a processor hardware layer to deliver messages between the one or more processes without using the off-chip network, wherein generating the simulated loopback comprises:
    generating a core-process-to-IP-address map;
    identifying a destination core for a message based on the core-process-to-IP-address map;
    identifying data associated with the message to be delivered to the identified destination core; and
    processing the identified data back into one or more on-chip flits to be delivered to the identified destination core.

2. The method of claim 1, wherein generating the simulated loopback further comprises:
    delivering the identified data to the identified destination core without the message leaving a processor die.

3. The method of claim 2, wherein generating the simulated loopback further comprises redirecting packet traffic at each network, interface such that packets destined to other cores of the multicore processor are forwarded to a loopback simulator.

4. The method of claim 3, wherein generating the simulated loopback further comprises decoding the forwarded packets into flit form destined for the destination core when a loopback decode functionality is available.

5. The method of claim 1, wherein generating the core-process-to-IP-address map comprises forwarding, by a media access control layer of a processor network interface, at least one header associated with at least one flit address.

6. The method of claim 1, wherein generating the core-process to-IP-address map further comprises registering at least one map, value as part of communications over a network-on-chip (NoC) by one of a hypervisor and an operating system I/O driver.

7. The method of claim 1, wherein generating the core-process-to-IP-address map further comprises generating at least one virtual machine (VM) record, wherein the at least one VM record corresponds to a respective VM and includes a respective core location and a respective IP address.

8. The method of claim 7, wherein generating the core-process-to-IP-address map further comprises identifying the respective IP address for the at least one VM record by snooping packets produced by the corresponding core during times when the corresponding VM is active.

9. The method of claim 1, wherein generating the simulated loopback further comprises routing outgoing packets that have a destination associated with a core in the core-process-to-IP-address map as incoming packets for a NoC.

10. The method of claim 9, wherein generating the simulated loopback further comprises converting the outgoing packets into one or more flits directed to the core that is to receive the incoming packets.

11. The method of claim 9, wherein generating the simulated loopback further comprises routing the outgoing packets at a decode stage of the media access control layer.

12. The method of claim 1, further comprising exposing the core-process-to-IP-address map to a virtual machine manager (VMM) for use as a management tool.

13. The method of claim 1, wherein identifying, the destination core based on the core-process-to-IP-address map comprises identifying a VM identifier associated with the destination core.

14. A multicore processor adapted to perform on-chip loopback, the multicore processor comprising:
    a plurality of processor cores;
    a controller configured to identify one or more processes executing on the plurality of processor cores, the processes adapted to communicate with each other via an off-chip network, wherein the controller is further configured to:
    generate a core-process-to-IP-address map;
    identify a destination processor core for a message based on the core-process-to-IP-address map; and
    identify data associated with a message to be delivered to the identified destination processor core; and
    a loopback simulator at a processor hardware layer, the loopback simulator configured to deliver messages between the one or more processes via on-chip communication by processing the identified data back into one or more on-chip flits to be delivered to the identified destination processor core.

15. The multicore processor of claim 14, wherein
    the loopback simulator is further configured to:
    deliver the identified data to the identified destination processor core without the message leaving a processor die.

16. The multicore processor of claim 15, wherein the loopback simulator is further configured to route outgoing packets that have a destination associated with a processor core in the core-process-to-IP-address map as incoming packets for a NoC.

17. The multicore processor of claim 16, wherein the loopback simulator is further configured to convert the outgoing packets into one or more flits directed to the processor core that is to receive the incoming packets.

18. The multicore processor of claim 16, wherein the loopback simulator is further configured to route the outgoing packets at a decode stage of the media access control layer.

19. The multicore processor of claim 14, wherein the controller is configured to generate the core-process-to-IP-address map by forwarding of at least one header associated with at least one flit address at a media access control layer of a processor network interface.

20. The multicore processor of claim 14, wherein the controller is configured to generate the core-process-to-IP-address map by having one of a hypervisor or an operating system I/O driver register at least one map value as part of communications over a network-on-chip (NoC).

21. The multicore processor of claim 14, wherein the controller is configured to generate the core-process-to-IP-address map by generation of at least one virtual machine (VM) record, the at least one VM record corresponding to a respective VM and including a respective processor core location and a respective IP address.

22. The multicore processor of claim 14, wherein the controller is configured to identify the respective IP address by snooping of packets produced by the corresponding processor core during times when the corresponding VM is active.

23. The multicore processor of claim 22, wherein the controller is configured to snoop packets at processor edge network hardware using a single copy of snooping hardware per network port.

24. The multicore processor of claim 22, wherein the controller is configured to snoop packets using separate snooping hardware for each processor core in the plurality of processor cores.

25. The multicore processor of claim 14, wherein the controller is further configured to maintain the core-process-to-IP-address map at each of a plurality of network interfaces such that each of the plurality of network interfaces forwards packets destined to other processor cores in the plurality of processor cores to the loopback simulator.

26. The multicore processor of claim 25, wherein the loopback simulator is further configured to:
perform packet decoding; and
decode the forwarded packets into flit form destined, for the destination processor core.

27. The multicore processor of claim 26, wherein the loopback simulator is configured to duplicate logic used to convert incoming packets to one or, more flits for the NoC.

28. The multicore processor of claim 14, wherein the controller is further configured to expose the core-process-to-IP-address map to a virtual machine manager (VMM) for use as a management tool.

29. The multicore processor of claim 14, wherein the controller is configured to generate the core-process-to-IP-address map by inclusion of a plurality of VM identifiers, each VM identifier associated with a core identifier.

30. The multicore processor of claim 29, wherein the core-process-to-IP-address map is implemented using a direct mapped buffer with a "not active bit" indicating whether a VM is currently in state storage.

31. The multicore processor of claim 14, wherein each of the plurality of processor cores executes a different operating system.

32. A non-transitory computer readable medium with instructions stored thereon, which when executed on one or more computing devices execute a method for on-chip loopback in multicore processors, wherein the method includes:
identifying one or more processes on a multicore processor, wherein the processes are adapted to communicate with each other via an off-chip network; and
generating a simulated network loopback at a processor hardware layer to deliver messages between the one or more processes without using the off-chip network by:
generating the core-process-to-IP-address map by generating at least one virtual machine (VM) record, the at least one VM record corresponding to a respective VM and including a respective processor core location and a respective IP address;
identifying a destination core for a message at one of a media access control layer or a physical layer of the multicore processor based on the core-process-to-IP-address map;
identifying data associated with the message to be delivered to the identified destination core; and
processing the identified data back into one or more on-chip flits to be delivered to the identified destination core.

33. The non-transitory computer readable medium of claim 32, wherein
the core-process-to-IP-address map is generated by having one of a hypervisor or an operating system I/O driver register at least one map value as, part of communications over a network-on-chip (NoC).

* * * * *